United States Patent
Syvänne et al.

(10) Patent No.: US 10,834,131 B2
(45) Date of Patent: Nov. 10, 2020

(54) PROACTIVE TRANSPORT LAYER SECURITY IDENTITY VERIFICATION

(71) Applicant: Forcepoint LLC, Austin, TX (US)

(72) Inventors: Tuomo Syvänne, Helsinki (FI);
Olli-Pekka Niemi, Helsinki (FI);
Valtteri Rahkonen, Helsinki (FI)

(73) Assignee: Forcepoint LLC, Austin, TX (US)

( * ) Notice: Subject to any disclaimer, the term of this patent is extended or adjusted under 35 U.S.C. 154(b) by 233 days.

(21) Appl. No.: 15/824,214

(22) Filed: Nov. 28, 2017

(65) Prior Publication Data
US 2019/0166160 A1 May 30, 2019

(51) Int. Cl.
*H04L 29/06* (2006.01)

(52) U.S. Cl.
CPC ........ *H04L 63/166* (2013.01); *H04L 63/0227* (2013.01); *H04L 63/0281* (2013.01); *H04L 63/0823* (2013.01); *H04L 63/20* (2013.01); *H04L 63/1408* (2013.01)

(58) Field of Classification Search
CPC ............. H04L 63/0227; H04L 63/0281; H04L 63/0823; H04L 63/1408; H04L 63/166; H04L 63/20; H04L 9/3247; G06F 21/52; G06F 21/602; G06F 21/64; G06F 21/72
See application file for complete search history.

(56) References Cited

U.S. PATENT DOCUMENTS

| | | | | |
|---|---|---|---|---|
| 5,623,601 A * | 4/1997 | Vu | ........................... | H04L 29/06 726/12 |
| 8,190,879 B2 * | 5/2012 | Wang | .................... | H04L 63/029 713/153 |
| 8,214,635 B2 * | 7/2012 | Wang | ................... | H04L 63/0464 713/156 |
| 9,124,628 B2 * | 9/2015 | Shankar | ................ | H04L 63/166 |
| 9,774,631 B2 * | 9/2017 | Mazur | ................... | H04L 9/3265 |
| 10,454,689 B1 * | 10/2019 | Sharifi Mehr | ........ | H04L 63/166 |

(Continued)

OTHER PUBLICATIONS

Donald Eastlake 3rd, RFC 6066, Jan. 2011, IETF (Year: 2011).*

(Continued)

*Primary Examiner* — Mahfuzur Rahman
*Assistant Examiner* — Richard W Cruz-Franqui
(74) *Attorney, Agent, or Firm* — Jackson Walker L.L.P.

(57) ABSTRACT

A method, system, and computer-usable medium are disclosed for (a) responsive to communication of a client handshake from a client to a server for establishing encrypted communications between the client and the server: (i) holding open, by an intermediate verification system interfaced between the server and the client, the client handshake; and (ii) opening a connection between the intermediate verification system and the server via which the intermediate verification system issues a server verification handshake to the server; (b) responsive to issuance of the server verification handshake to the server, receiving a server certificate associated with the server by the intermediate verification system; (c) responsive to receipt of the server certificate, processing, by the intermediate verification system, the server certificate to determine an identity of the server; and (d) rendering, by the intermediate verification system, a security policy decision regarding traffic between the server and client based on the identity.

21 Claims, 3 Drawing Sheets

(56) References Cited

U.S. PATENT DOCUMENTS

| | | | | |
|---|---|---|---|---|
| 2006/0143442 | A1* | 6/2006 | Smith | H04L 63/166 |
| | | | | 713/156 |
| 2008/0052756 | A1* | 2/2008 | Morishige | H04L 63/164 |
| | | | | 726/1 |
| 2010/0318784 | A1* | 12/2010 | Rao | H04L 63/0823 |
| | | | | 713/151 |
| 2013/0312054 | A1* | 11/2013 | Wang | H04L 63/166 |
| | | | | 726/1 |
| 2014/0082204 | A1* | 3/2014 | Shankar | H04L 63/166 |
| | | | | 709/227 |
| 2015/0006887 | A1* | 1/2015 | Brand | G06F 21/33 |
| | | | | 713/156 |
| 2017/0223054 | A1* | 8/2017 | Wing | H04L 63/166 |
| 2019/0166160 | A1* | 5/2019 | Syvanne | H04L 63/166 |
| 2019/0356694 | A1* | 11/2019 | Wang | H04L 63/0823 |
| 2019/0394049 | A1* | 12/2019 | Hartwig | H04L 63/12 |

OTHER PUBLICATIONS

Shane Miller et al., Securing the internet through the detection of anonymous proxy usage, 2015, World Congress on Internet Security, IEEE (Year: 2015).*

Davide Sanvito et al., Towards traffic classification offloading to stateful SDN data planes, 2017, 2017 IEEE Conference on Network Softwarization, IEEE (Year: 2017).*

Sourcefire, Examining SSL-encrypted Communications, Sourcefire SSL Appliance Technology Brief, 2010, www.sourcefire.com, 5.10 Rev 1 (Year: 2010).*

NPL Search (Google Scholar) (Year: 2020).*

\* cited by examiner

PROACTIVE TRANSPORT LAYER SECURITY IDENTITY VERIFICATION

FIELD OF DISCLOSURE

The present invention relates in general to the field of computers and similar technologies, and in particular to software utilized in this field. Still more particularly, it relates to a method, system and computer-usable medium for performing proactive transport layer security identify verification to improve network security.

BACKGROUND

Transport Layer Security (TLS) is a cryptographic protocol that provides communications security over a computer network. The protocol, and its predecessor, Secure Sockets Layer (SSL) protocol, find widespread use in applications such as web browsing, email, Internet faxing, instant messaging, and voice-over-IP (VoIP). Websites often use TLS to secure all communications between their servers and web browsers. TLS protocol aims primarily to provide privacy and data integrity between two communicating computer applications. When secured by TLS, connections between a client (e.g., a web browser) and a server (e.g., a web server) may have one or more particular properties. For example, a connection between the client and a server may be private or secure because symmetric cryptography may be used to encrypt the data transmitted. As another example, the identity of the communicating parties may be authenticated using public-key cryptography. As a further example, the connection ensures integrity because each message transmitted may include a message integrity check using a message authentication code to prevent undetected loss or alteration of the data during transmission.

While TLS has the advantage of enabling trusted communications between a server and a client, one disadvantage of TLS and similar protocols may be that with encrypted data being communicated between a server and a client, a firewall or proxy-based gateway device interfaced as an intermediate device between the server and the client may not be able to make policy decisions to prevent malicious attacks by inspecting the encrypted data. In such existing intermediate devices, data payloads of network traffic may be analyzed to make security policy decisions for the network traffic. Typically, such an intermediate device may be enabled to make policy decisions such as allowing or disallowing a network communication, and more modern devices may be capable of performing decryption of network communications and be able to support, in security decisions to allow or disallow traffic, security decisions that network traffic should be decrypted and inspected or decrypted and allowed with first performing decryption and inspection.

A decision of whether decryption is performed may be related to local regulatory requirements in certain geographical areas, such as legal requirements in some jurisdictions prohibiting decryption by intermediate devices of certain network traffic such as TLS sessions related to banking or other proprietary or specific system communications identifiable by a TLS server certificate (e.g., typically the signing certificate authority) while other types of TLS sessions may be unregulated under the law and thus subject to decryption by an intermediate device to allow enforcement of an organization's network security policy.

In some cases it is not possible to wait until server certificate is seen, or in some instances, a server certificate may not be in a connection, for example, in situations in which a TLS client proposes TLS versions, TLS extensions, or encryption ciphers that are not supported by the intermediate device's decryption capabilities, or as another example where a TLS client resumes a TLS session which has not been seen and cached by an intermediate device, such that the intermediate device may need to make a guess of what policy decision would be made and act accordingly, which may potentially result in an action such as decrypting the traffic during a TLS Client Hello message which may later be identified to be an incorrect action when the TLS server identity has been determined.

In these and other cases, TLS may be maliciously misused by malware and peer-to-peer applications and services that evade local security enforcement may masquerading as TLS connections. Such malicious applications and services may utilize false Server Name Identification (SNI) information and/or may mimic only some visible portions of TLS in order to evade security. Such malicious applications and services may also use a legitimate certificate from a legitimate server in order to attempt to evade security.

SUMMARY

In accordance with the teachings of the present disclosure, certain disadvantages and problems associated with existing approaches to network and data security have been reduced or eliminated.

In accordance with embodiments of the present disclosure, a computer-implementable method for securing network communication may include, responsive to communication of a client handshake from a client to a server for establishing encrypted communications between the client and the server, holding open, by an intermediate verification system interfaced between the server and the client, the client handshake and opening a connection between the intermediate verification system and the server via which the intermediate verification system issues a server verification handshake to the server. The method may also include, responsive to issuance of the server verification handshake to the server, receiving a server certificate associated with the server by the intermediate verification system. The method may additionally include, responsive to receipt of the server certificate, processing, by the intermediate verification system, the server certificate to determine an identity of the server. The method may further include rendering, by the intermediate verification system, a security policy decision regarding traffic between the server and the client based on the identity.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations. The computer program code may be executable by the processor and configured for: (a) responsive to communication of a client handshake from a client to a server for establishing encrypted communications between the client and the server: (i) holding open, by an intermediate verification system interfaced between the server and the client, the client handshake; and (ii) opening a connection between the intermediate verification system and the server via which the intermediate verification system issues a server verification handshake to the server; (b) responsive to issuance of the server verification handshake to the server, receiving a server certificate associated with the server by the intermediate verification system; (c) responsive to receipt of the server certificate, processing, by the intermediate verification system, the server certificate to determine an identity of the server; and (d) rendering, by the intermediate verification system, a security policy decision regarding traffic between the server and the client based on the identity.

In accordance with these and other embodiments of the present disclosure, a non-transitory, computer-readable storage medium embodying computer program code may be disclosed, the computer program code comprising computer executable instructions configured for: (a) responsive to communication of a client handshake from a client to a server for establishing encrypted communications between the client and the server: (i) holding open, by an intermediate verification system interfaced between the server and the client, the client handshake; and (ii) opening a connection between the intermediate verification system and the server via which the intermediate verification system issues a server verification handshake to the server; (b) responsive to issuance of the server verification handshake to the server, receiving a server certificate associated with the server by the intermediate verification system; (c) responsive to receipt of the server certificate, processing, by the intermediate verification system, the server certificate to determine an identity of the server; and (d) rendering, by the intermediate verification system, a security policy decision regarding traffic between the server and the client based on the identity.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a mobile device such as a tablet or smartphone, a connected "smart device," a network appliance, a network storage device, or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more communications ports for communicating with networked devices, external devices, and various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
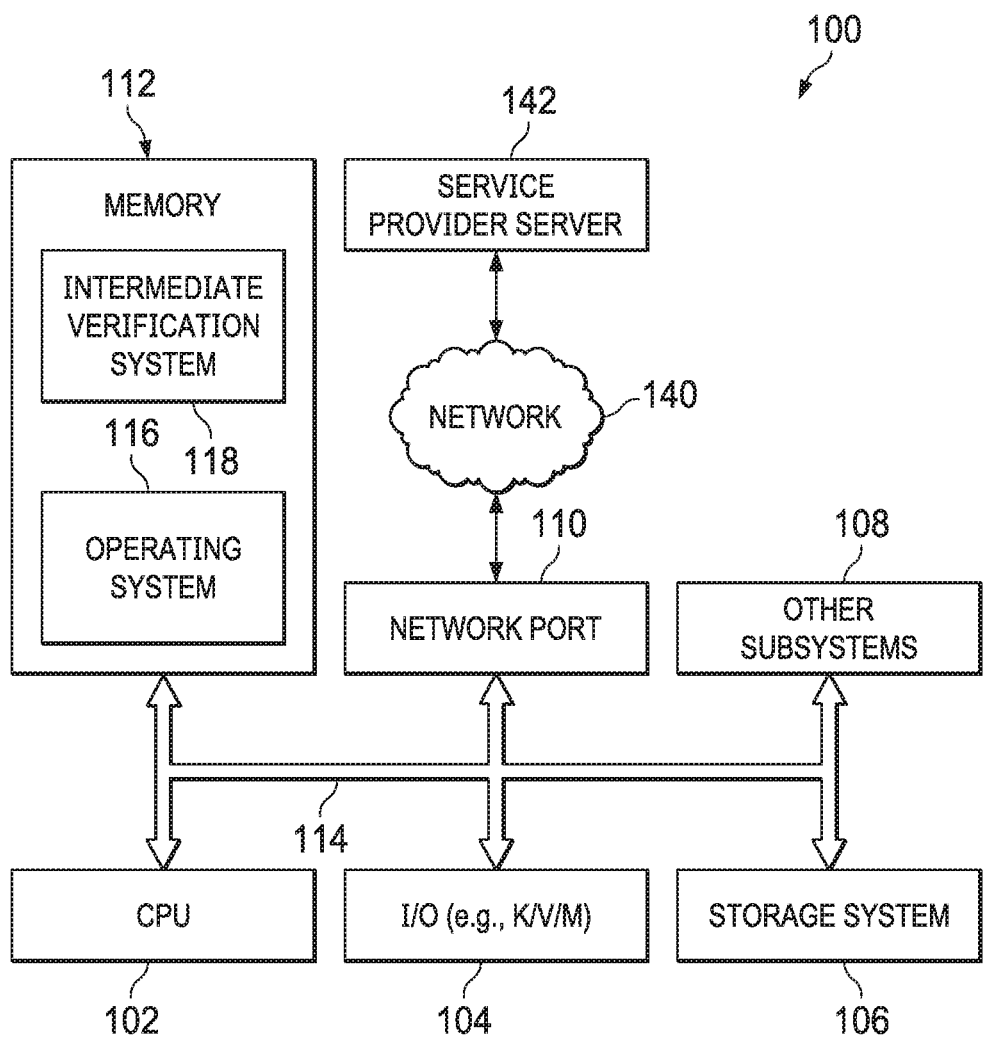
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include an intermediate verification system 118. In some embodiments, information handling system 100 may be able to download intermediate verification system 118 from service provider server 142. In other embodiments, intermediate verification system 118 may be provided as a service from the service provider server 142.

In various embodiments, intermediate verification system 118 may be configured to enforce a network security policy related to network communications between an external network (e.g., external network 202 in FIG. 2) and endpoint device (e.g., endpoint device 244 or 246 in FIG. 2), as described in greater detail elsewhere in this disclosure. In particular, intermediate verification system 118 may be configured to analyze encrypted traffic (e.g., traffic communicated in accordance with TLS) and perform proactive server identity verification in order make a policy decision (e.g., allow, disallow, decrypt and inspect) with respect to the traffic, as described in greater detail elsewhere in this disclosure. In some embodiments, intermediate verification system 118 and the functionality thereof may improve processor efficiency, and thus the efficiency of the information handling system 100, by performing network security operations with greater efficiency and with decreased processing resources as compared to existing approaches for similar network security operations. In these and other embodiments, intermediate verification system 118 and the functionality thereof may improve effectiveness in ensuring network security, and thus the effectiveness of information handling system 100, by performing network security operations with greater effectiveness to existing approaches for similar network security operations. As will be appreciated, once information handling system 100 is configured to perform the functionality of intermediate verification system 118, information handling system 100 becomes a specialized computing device specifically configured to perform the functionality of intermediate verification system 118, and is not a general purpose computing device. Moreover, the implementation of functionality of intermediate verification system 118 on information handling system 100 improves the functionality of information handling system 100 and provides a useful and concrete result of improving network security by analyzing encrypted traffic and performing proactive server identity verification in order make policy decisions with respect to the traffic.

Figure 2:
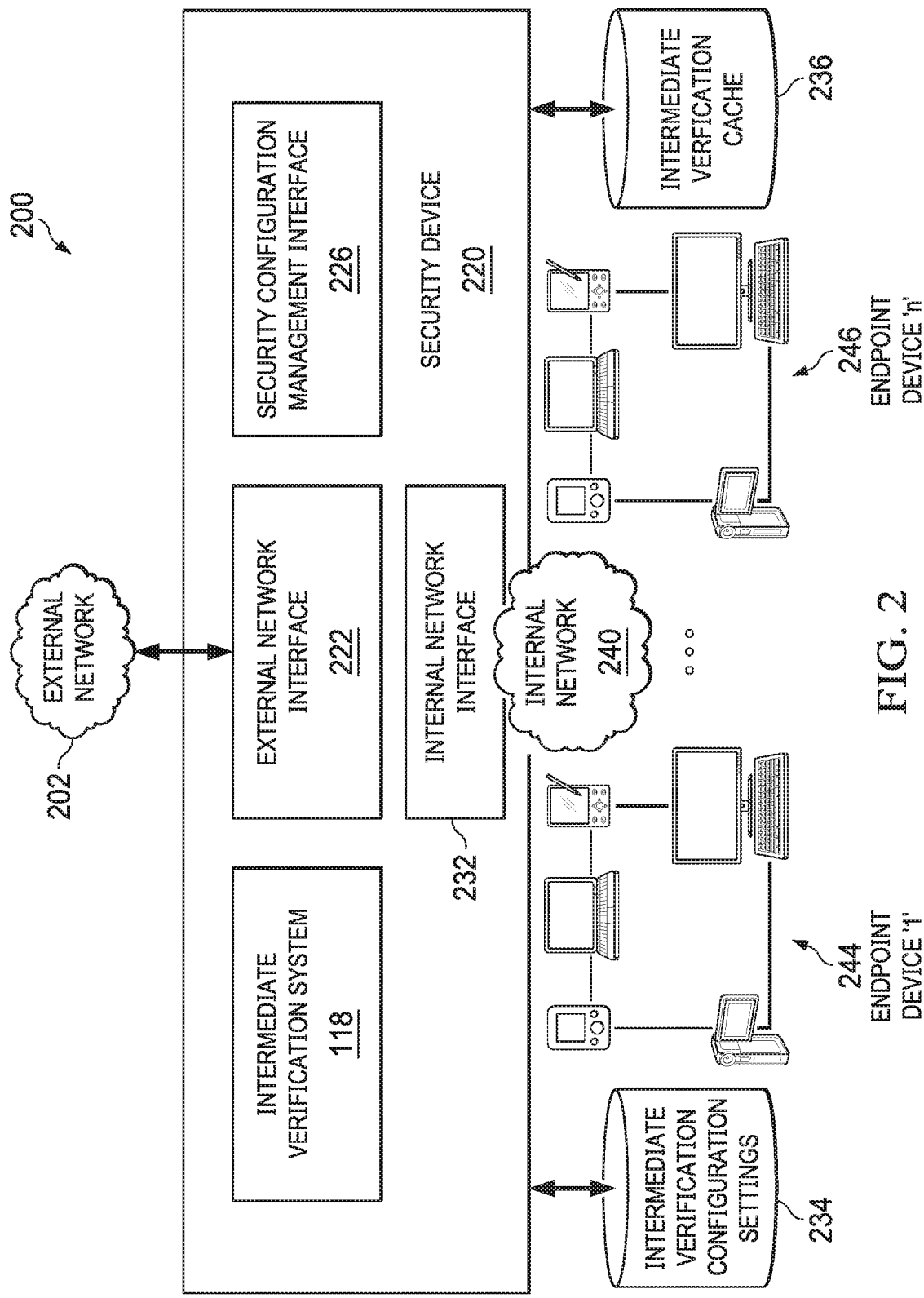
FIG. 2 illustrates a block diagram of a system for performing proactive transport layer security identity verification, in accordance with embodiments of the present disclosure.

FIG. 2 illustrates a block diagram of a system for performing deep packet inspection using cached inspection results, in accordance with embodiments of the present disclosure. In some embodiments, a security device 220 may include an external network interface 222, a security configuration management interface 226, and an intermediate verification system 118. Security device 220 may be implemented using any suitable information handling system 100, including without limitation a firewall, an intrusion prevention system, an intrusion detection system, a proxy, or any other suitable security device capable of implementing intermediate verification system 118. In some embodiments, security device 220 may be implemented as an individual security device 220, a virtual context security device 220, or a security device 220 cluster.

Security device 220 may also include in some embodiments a repository of intermediate verification configuration settings 234 and an intermediate verification cache 236. In certain embodiments, firewall configuration management interface 226 may be implemented to receive instructions relating to network security policy decisions from intermediate verification system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240. In various embodiments, the communication of the data may take place in real-time or near-real-time.

Embodiments of the invention may reflect an appreciation that network communication may represent an efficient means for communicating useful information. However, those of skill in the art will likewise appreciate that network communications are often used in an attempt to compromise the security of a network. In particular, payload data of packets in a data stream may include malicious content in an attempt to perform many different types of malicious attacks. Identifying such malicious content may be rendered more difficult when data is encrypted using TLS or another encryption protocol. Known approaches to intercept malicious content encrypted within network traffic include using an intermediate device (e.g., firewall or gateway) to decrypt and inspect the data. Those of skill in the art may appreciate that use of such an intermediate device may provide a high level of security in a network, but traditional approaches to implementing such an intermediate device are not useful in all cases, and often require compute-intensive resources.

In operation, intermediate verification system 118 may, in response to a TLS client handshake being communicated from a client (e.g., endpoint device 244, 246) to a server (e.g., in external network 202), hold the client handshake while opening its own connection to the server in order to perform its own server verification handshake in order to fetch a TLS server certificate for the server identified in the client handshake, thus verifying the identity of the TLS server. To optimize performance, intermediate verification system 118 may cache (e.g., within intermediate verification cache 236) the result of the fetch for the TLS server identified in the client handshake, thus enabling decisions based on contents of the cache without needing to establish a new connection from intermediate verification system 118 to the server when the client or another client attempts to open another connection to the server. Intermediate verification system 118 may also, after processing the TLS server certificate and performing verification of the server identity based on the TLS server certificate, render a policy decision (e.g., allow, disallow, decrypt and inspect). In some embodiments, such policy decision may be in accordance with rules or policies set forth in intermediate verification settings 234. Intermediate verification system 118 may also include functionality such as that described with respect to method 300, below.

Figure 3:
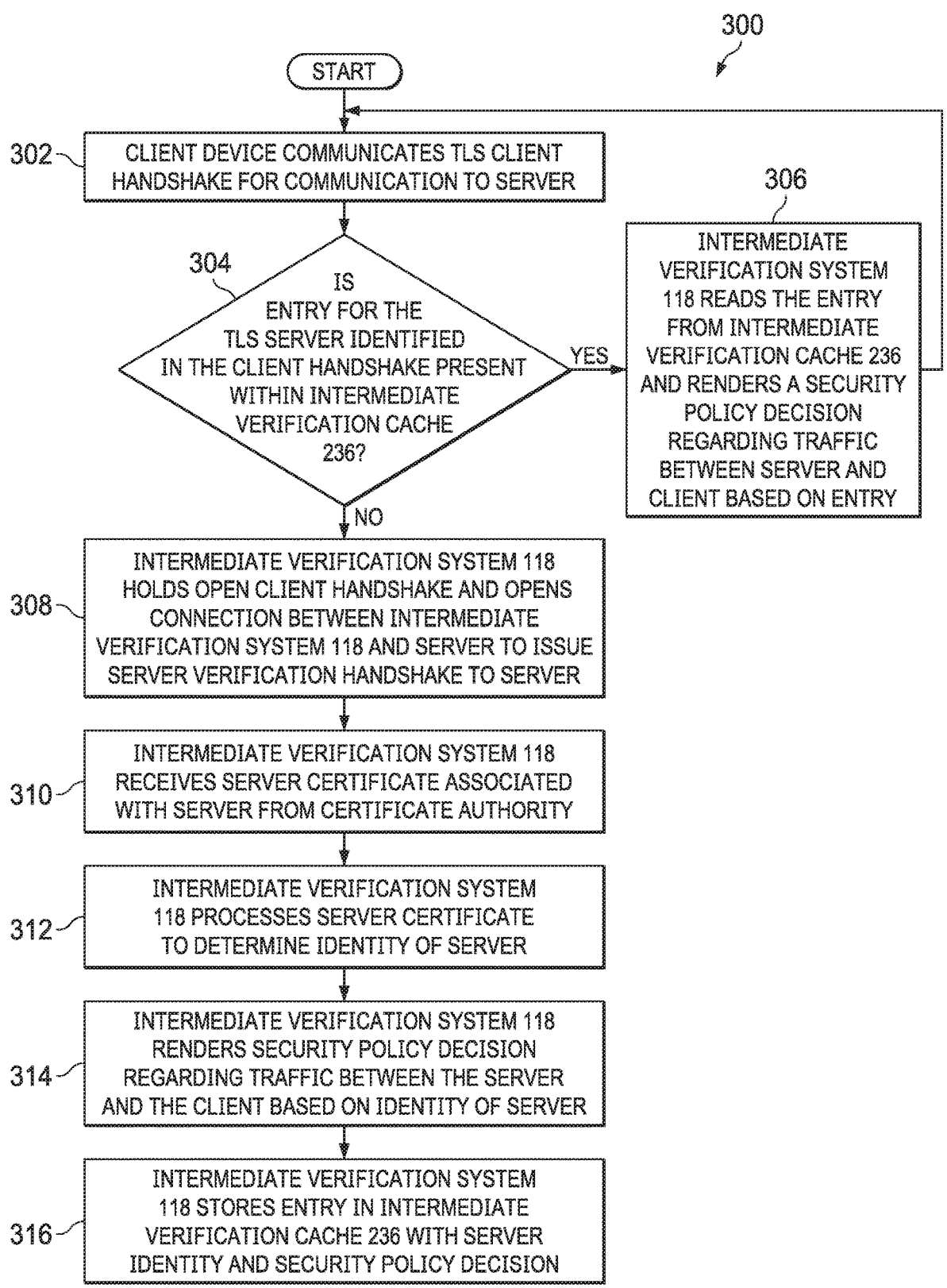
FIG. 3 illustrates a flow chart of an example method for performing proactive transport layer security identity verification, in accordance with embodiments of the present disclosure.

FIG. 3 illustrates a flow chart of an example method 300 for performing proactive transport layer security identity verification, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

At step 302, intermediate verification system 118 may determine that a client device (e.g., endpoint device 244, endpoint device 246) has communicated a TLS client handshake for communication to a server (e.g., a server executing within external network 202). At step 304, intermediate verification system 118 may, responsive to the client handshake, determine if an entry for the TLS server identified in the client handshake exists within intermediate verification cache 236. If an entry for the TLS server identified in the client handshake exists within intermediate verification cache 236, method 300 may proceed to step 306. Otherwise, if an entry for the TLS server identified in the client handshake is absent from intermediate verification cache 236, method 300 may proceed to step 308.

Alternatively to the foregoing, in some embodiments, the determination of step 304 may be determined at some other time, such as, for example, when a server handshake message is received. As an example, in some situations in may not be possible to make the determination of step 304 from information within the client handshake.

At step 306, responsive to an entry for the server identified in the client handshake existing within intermediate verification cache 236, intermediate verification system 118 may read the entry from intermediate verification cache 236 and render a security policy decision regarding traffic between the server and the client. In some embodiments, such security policy decision may be based on a security policy decision set forth in the cache entry retrieved from intermediate verification cache 236, wherein such existing security policy decision resulted from a prior verification or attempted verification of the server. In these and other embodiments, the security policy decision may include a security action such as, for example, allowing traffic between the server and the client, disallowing traffic between the server and the client, or decrypting and inspecting traffic between the server and the client (and determining whether to allow or disallow based on such inspection). After completion of step 306, method 300 may proceed again to step 302.

At step 308, responsive to an entry for the server identified in the client handshake being absent from intermediate verification cache 236, intermediate verification system 118 may hold open the client handshake and open a connection between intermediate verification system 118 and the server in which intermediate verification system 118 issues its own server verification handshake to the server. In some embodiments, holding open the client handshake may be optional. For example, an intrusion detection system in a capture mode may not be able to hold packets. As another example, an intrusion prevention system may be able to terminate connections (as detailed below) as soon as an answer from the server is received, without any need to hold open the handshake while waiting.

At step 310, in response to the server verification handshake from intermediate verification system 118 to the server, intermediate verification system 118 may receive a server certificate associated with the server from the server. At step 312, intermediate verification system 118 may process the server certificate to determine an identity of the server. For example, such identify may be determined and verified in any suitable manner, including determining whether the server certificate is from a known certificate authority, whether the server certificate matches with a public key, a time of validity of the server certificate, whether the identity in the server certificate matches with an expected identity, and/or other manners of identification and verification.

Based on the server identity, at step 314, intermediate verification system 118 may render a security policy decision regarding traffic between the server and the client. In these and other embodiments, the security policy decision may include a security action such as, for example, allowing traffic between the server and the client, disallowing traffic between the server and the client, or decrypting and inspecting traffic between the server and the client (and determining whether to allow or disallow based on such inspection). At step 316, intermediate verification system 118 may store an entry in intermediate verification cache 236 setting forth information regarding the server identity and the security policy decision rendered by intermediate verification system 118. In some embodiments, After completion of step 316, method 300 may proceed again to step 302.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, intermediate verification system 118 executing thereon, and/or any other system operable to implement method 300. In certain embodiments, method 300 may be implemented partially or fully in software and/or firmware embodied in computer-readable media.

While the foregoing contemplates an intermediate verification system configured to control an encryption decision based on information not yet available by holding open a handshake message, intermediate verification system 118 may implement systems and methods similar to those described above in order to perform server validation of a server within an external network (e.g., external network 202) for security devices that do not perform decryption (e.g., an intrusion detection system, operation of security device 220 in a mode in which TLS decryption is not enabled, validation via Server Name Identification, or other operation in which traffic should not be decrypted), and render a policy decision (e.g., allow or disallow) based on such server validation.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method for securing network communication, comprising:
    responsive to communication of a client handshake from a client to a server for establishing encrypted communications between the client and the server:
        holding open, by an intermediate verification system interfaced between the server and the client, the client handshake; and opening a connection between the intermediate verification system and the server via which the intermediate verification system issues a server verification handshake to the server;

responsive to issuance of the server verification handshake to the server, receiving a server certificate associated with the server by the intermediate verification system;

responsive to receipt of the server certificate, processing, by the intermediate verification system, the server certificate to determine an identity of the server and a geographical area associated with the server; and rendering, by the intermediate verification system, a security policy decision regarding traffic between the server and the client based on the identity;

wherein the security policy decision includes determining, based on a legal or regulatory requirement associated with the geographical area and associated with the traffic between the server and the client, whether or not to decrypt the traffic between the server and the client for further inspection, wherein the determining whether or not to decrypt the traffic is further based on the server certificate, such that the decryption is prevented when the server certificate is indicative of a type of traffic for which decryption is prohibited by the legal or regulatory requirement within the geographical area.

2. The method of claim 1, wherein the security policy decision comprises one of:

allowing traffic to be communicated between the server and the client;

disallowing traffic to be communicated between the server and the client; and decrypting and inspecting traffic between the server and the client and determining whether to allow or disallow traffic to be communicated between the server and the client based on such inspection.

3. The method of claim 1, further comprising storing, by the intermediate verification system, a new entry in a cache setting forth information regarding the server identity and the security policy decision rendered by the intermediate verification system.

4. The method of claim 3, further comprising:

responsive to communication of a second client handshake from the client or another client to the server or another server for establishing encrypted communications between the client or other client and the server or other server, determining Mill whether an existing entry for the server or other server exists within the cache;

responsive to the existing entry for the server or other server existing within the cache, reading, by the intermediate verification system, the existing entry from the cache; and rendering, by the intermediate verification system, another security policy decision regarding traffic between the server or other server and the client or other client based on contents of the existing entry.

5. The method of claim 4, further comprising:

responsive to no existing entry for the server or other server existing within the cache:

holding open, by the intermediate verification, the second client handshake; and opening a connection between the intermediate verification system and the server or other server via which the intermediate verification system issues a second server verification handshake to the server or other server;

responsive to issuance of the server verification handshake to the server or other server, receiving a second server certificate associated with the server or other server by the intermediate verification system;

responsive to receipt of the second server certificate, processing, by the intermediate verification system, the second server certificate to determine a second identity of the server or other server; and rendering, by the intermediate verification system, a second security policy decision regarding traffic between the server or other server and the client or other client based on the second identity.

6. The method of claim 1, wherein the intermediate verification system is embodied with one of a firewall and a proxy-based gateway.

7. The method of claim 1, wherein the client handshake and the server verification handshake each comprise a handshake communicated in accordance with Transport Layer Security protocol.

8. A system comprising:

a processor; and a non-transitory, computer-readable storage medium embodying instructions executable by the processor for:

responsive to communication of a client handshake from a client to a server for establishing encrypted communications between the client and the server:

holding open, by an intermediate verification system interfaced between the server and the client, the client handshake; and opening a connection between the intermediate verification system and the server via which the intermediate verification system issues a server verification handshake to the server;

responsive to issuance of the server verification handshake to the server, receiving a server certificate associated with the server by the intermediate verification system;

responsive to receipt of the server certificate, processing, by the intermediate verification system, the server certificate to determine an identity of the server and a geographical area associated with the server; and rendering, by the intermediate verification system, a security policy decision regarding traffic between the server and the client based on the identity;

wherein the security policy decision includes determining, based on a legal or regulatory requirement associated with the geographical area and associated with the traffic between the server and the client, whether or not to decrypt the traffic between the server and the client for further inspection, wherein the determining whether or not to decrypt the traffic is further based on the server certificate, such that the decryption is prevented when the server certificate is indicative of a type of traffic for which decryption is prohibited by the legal or regulatory requirement within the geographical area.

9. The system of claim 8, wherein the security policy decision comprises one of:

allowing traffic to be communicated between the server and the client;

disallowing traffic to be communicated between the server and the client; and decrypting and inspecting traffic between the server and the client and determining whether to allow or disallow traffic to be communicated between the server and the client based on such inspection.

10. The system of claim 8, the instructions further configured for storing, by the intermediate verification system, a new entry in a cache setting forth information regarding the server identity and the security policy decision rendered by the intermediate verification system.

11. The system of claim 10, the instructions further configured for:
responsive to communication of a second client handshake from the client or another client to the server or another server for establishing encrypted communications between the client or other client and the server or other server, determining Mill whether an existing entry for the server or other server exists within the cache;
responsive to the existing entry for the server or other server existing within the cache, reading, by the intermediate verification system, the existing entry from the cache; and
rendering, by the intermediate verification system, another security policy decision regarding traffic between the server or other server and the client or other client based on contents of the existing entry.

12. The system of claim 11, the instructions further configured for:
responsive to no existing entry for the server or other server existing within the cache:
holding open, by the intermediate verification, the second client handshake; and opening a connection between the intermediate verification system and the server or other server via which the intermediate verification system issues a second server verification handshake to the server or other server;
responsive to issuance of the server verification handshake to the server or other server, receiving a second server certificate associated with the server or other server by the intermediate verification system;
responsive to receipt of the second server certificate, processing, by the intermediate verification system, the second server certificate to determine a second identity of the server or other server; and
rendering, by the intermediate verification system, a second security policy decision regarding traffic between the server or other server and the client or other client based on the second identity.

13. The system of claim 8, wherein the intermediate verification system is embodied with one of a firewall and a proxy-based gateway.

14. The system of claim 8, wherein the client handshake and the server verification handshake each comprise a handshake communicated in accordance with Transport Layer Security protocol.

15. A non-transitory, computer-readable storage medium embodying computer executable instructions configured for:
responsive to communication of a client handshake from a client to a server for establishing encrypted communications between the client and the server:
holding open, by an intermediate verification system interfaced between the server and the client, the client handshake; and
opening a connection between the intermediate verification system and the server via which the intermediate verification system issues a server verification handshake to the server;
responsive to issuance of the server verification handshake to the server, receiving a server certificate associated with the server by the intermediate verification system;
responsive to receipt of the server certificate, processing, by the intermediate verification system, the server certificate to determine an identity of the server and a geographical area associated with the server; and
rendering, by the intermediate verification system, a security policy decision regarding traffic between the server and the client based on the identity;
wherein the security policy decision includes determining, based on a legal or regulatory requirement associated with the geographical area and associated with the traffic between the server and the client, whether or not to decrypt the traffic between the server and the client for further inspection, wherein the determining whether or not to decrypt the traffic is further based on the server certificate, such that the decryption is prevented when the server certificate is indicative of a type of traffic for which decryption is prohibited by the legal or regulatory requirement within the geographical area.

16. The non-transitory, computer-readable storage medium of claim 15, wherein the security policy decision comprises one of:
allowing traffic to be communicated between the server and the client;
disallowing traffic to be communicated between the server and the client; and
decrypting and inspecting traffic between the server and the client and determining whether to allow or disallow traffic to be communicated between the server and the client based on such inspection.

17. The non-transitory, computer-readable storage medium of claim 15, the computer executable instructions further configured for storing, by the intermediate verification system, a new entry in a cache setting forth information regarding the server identity and the security policy decision rendered by the intermediate verification system.

18. The non-transitory, computer-readable storage medium of claim 17, the computer executable instructions further configured for:
responsive to communication of a second client handshake from the client or another client to the server or another server for establishing encrypted communications between the client or other client and the server or other server, determining Mill whether an existing entry for the server or other server exists within the cache;
responsive to the existing entry for the server or other server existing within the cache, reading, by the intermediate verification system, the existing entry from the cache; and
rendering, by the intermediate verification system, another security policy decision regarding traffic between the server or other server and the client or other client based on contents of the existing entry.

19. The non-transitory, computer-readable storage medium of claim 18, the computer executable instructions further configured for:
responsive to no existing entry for the server or other server existing within the cache:
holding open, by the intermediate verification, the second client handshake; and opening a connection between the intermediate verification system and the server or other server via which the intermediate verification system issues a second server verification handshake to the server or other server;

responsive to issuance of the server verification handshake to the server or other server, receiving a second server certificate associated with the server or other server by the intermediate verification system;

responsive to receipt of the second server certificate, processing, by the intermediate verification system, the second server certificate to determine a second identity of the server or other server; and rendering, by the intermediate verification system, a second security policy decision regarding traffic between the server or other server and the client or other client based on the second identity.

20. The non-transitory, computer-readable storage medium of claim 15, wherein the intermediate verification system is embodied with one of a firewall and a proxy-based gateway.

21. The non-transitory, computer-readable storage medium of claim 15, wherein the client handshake and the server verification handshake each comprise a handshake communicated in accordance with Transport Layer Security protocol.

* * * * *